United States Patent
Saarikivi

(10) Patent No.: US 7,505,849 B2
(45) Date of Patent: Mar. 17, 2009

(54) NAVIGATION TAGS

(75) Inventor: Ilari Saarikivi, Salo (FI)

(73) Assignee: Nokia Corporation, Espoo (FI)

( * ) Notice: Subject to any disclaimer, the term of this patent is extended or adjusted under 35 U.S.C. 154(b) by 541 days.

(21) Appl. No.: 10/553,524

(22) PCT Filed: May 12, 2003

(86) PCT No.: PCT/IB03/01829

§ 371 (c)(1),
(2), (4) Date: Oct. 14, 2005

(87) PCT Pub. No.: WO2004/099717

PCT Pub. Date: Nov. 18, 2004

(65) Prior Publication Data

US 2006/0271274 A1    Nov. 30, 2006

(51) Int. Cl.
*G01C 21/00*    (2006.01)
*G06F 19/00*    (2006.01)

(52) U.S. Cl. .................. 701/207; 701/24; 701/213; 342/451

(58) Field of Classification Search .......... 701/23, 701/24, 25, 201, 207, 208, 211, 213; 342/451, 342/464, 463, 386; 180/169
See application file for complete search history.

(56) References Cited

U.S. PATENT DOCUMENTS

| | | | | |
|---|---|---|---|---|
| 5,412,573 | A * | 5/1995 | Barnea et al. ............... | 701/211 |
| 6,009,403 | A * | 12/1999 | Sato .............................. | 705/6 |
| 6,038,509 | A * | 3/2000 | Poppen et al. .............. | 701/210 |
| 6,339,746 | B1  | 1/2002 | Sugiyama et al. | |
| 6,771,189 | B2* | 8/2004 | Yokota ........................ | 340/990 |
| 6,900,762 | B2* | 5/2005 | Andrews et al. ............ | 342/463 |
| 2003/0014186 | A1  | 1/2003 | Cofino et al. | |
| 2003/0069029 | A1* | 4/2003 | Dowling et al. ............. | 455/456 |
| 2003/0080901 | A1  | 5/2003 | Piotrowski | |
| 2005/0004757 | A1* | 1/2005 | Neeman et al. ............. | 701/210 |
| 2005/0149251 | A1* | 7/2005 | Donath et al. ............... | 701/200 |
| 2006/0031009 | A1* | 2/2006 | Brulle-Drews .............. | 701/209 |

FOREIGN PATENT DOCUMENTS

| | | |
|---|---|---|
| DE | 4300927 | 7/1994 |
| EP | 0763712 | 3/1997 |
| EP | 0942345 | 9/1999 |
| EP | 1124110 | 8/2001 |

* cited by examiner

*Primary Examiner*—Tan Q Nguyen
(74) *Attorney, Agent, or Firm*—Alfred A. Fressola; Ware, Fressola, Van Der Sluys & Adolphson LLP

(57) ABSTRACT

The invention relates to a method for navigating within a navigation area (2), wherein a plurality of navigation tags (1) have been mounted at predetermined positions within the navigation area (2). To solve the object of the invention to provide a method and system for accurate and flexible navigating in various types of navigation scenarios, the method comprises the steps of: determining a sequence of navigation tags (1), which are associated with a desired route within the navigation area (2), based on the positions of the navigation tags (7) and on topographic information (8) on the navigation area (2); and navigating the route by passing navigation tags (1) of the sequence of navigation tags, whereby passing of a navigation tag is acknowledged (12, 13). The invention further relates to a system and a computer program product for navigating within a navigation area (2).

34 Claims, 3 Drawing Sheets

NAVIGATION TAGS

CROSS REFERENCE TO RELATED APPLICATIONS

This application is for entry into the U.S. national phase under §371 for International Application No. PCT/IB03/001829 having an international filing date of May 12, 2003, and from which priority is claimed under all applicable sections of Title 35 of the United States Code including, but not limited to, Sections 120, 363 and 365(c).

TECHNICAL FIELD

The invention relates to a method, a system and a computer program product for navigating within a navigation area, wherein a plurality of navigation tags have been mounted at predetermined positions within the navigation area.

BACKGROUND OF THE INVENTION

In several situations of modern life, humans find themselves encountered with the problem of quickly negotiating their way in complex-structured environments such as huge buildings or densely cropped cities. The same holds for the automatic guiding of machines. Apart from traditional approaches for navigation such as printed maps, verbal directions, signs or colour-coded lines painted on the walls or floors of large buildings, radio-based systems have gained recent industrial interest. Among these systems, especially the satellite-based systems such as the Global Positioning System (and the future Galileo system) can be deployed to provide users with position information and, in combination with dedicated navigation devices, also with directions towards a desired target.

However, satellite-based systems in general break down in indoor environments, because the line-of-sight connection to the satellite transmitters is heavily attenuated by concrete ceilings. Furthermore, the spatial resolution of these positioning systems may not be sufficient for navigation in small-scale scenarios.

U.S. Pat. No. 6,049,745 discloses a different approach for navigating automatic guided vehicles (AGVs) through a workplace scenario. A guidance apparatus, e.g. a wire guidance system embedded into the floor, serves as a basic orientation line for the AGV to travel along. Furthermore, Radio Frequency (RF) tags are provided along the guidance apparatus, where each tag is capable of conveying at least one of a plurality of unique RF signals in response to electromagnetic excitation fields. A controller on the AGV is then responsive to these RF signals and, upon reception of an RF signal, initiates a predetermined action of the AGV, such as for instance stopping, turning or honking. The navigation system disclosed in U.S. Pat. No. 6,049,745 is suited to control the traffic of several AGVs moving on prescribed routes through a navigation area. Changing the route of an AGV requires re-programming the RF signals produced by the RF tags and modification of the guidance apparatus. A flexible navigation of AGVs to changing targets is thus not possible.

In view of the above-mentioned problems, it is thus the object of the invention to provide a method and system for accurate and flexible navigating in various types of navigation scenarios.

To solve the object of the invention, it is proposed that a method for navigating within a navigation area, wherein a plurality of navigation tags have been mounted at predetermined positions within the navigation area, is characterised in that it comprises the steps of determining a sequence of navigation tags, which are associated with a desired route within the navigation area, based on said positions of the navigation tags and on topographic information on the navigation area, and navigating said route by passing navigation tags of said sequence of navigation tags, whereby passing of a navigation tag is acknowledged.

When a route, which comprises a start point and an end point and, where appropriate, one or more intermediate points, is defined by a user, the first navigation tag, the position of which is closest to the position of the start point is identified and then represents the first navigation tag in said sequence of navigation tags. Based on an intelligent routing method, then the route to the end point via the intermediate points is determined, where the navigation tags the position of which has the smallest Euclidean distance to this route or the navigation tags that are located at points of the route where a change of direction is necessary, are consecutively entered into said sequence of navigation tags. The user then, tag by tag, processes the sequence of navigation tags by physically passing each navigation tag. The passing of a navigation tag is acknowledged, and each acknowledged tag may be erased from the sequence, until the end point of the route is reached. Each entry in the sequence of navigation tags at least contains any kind of identification of the navigation tag, e.g. a number, a position or a colour code, so that passing of each navigation tag can be uniquely acknowledged. Further information on how to reach the next navigation tag may be included in each entry of the sequence of navigation tags as well, e.g. the direction or distance to the next navigation tag. Instead of navigating said route tag-by-tag, it is also possible to skip navigation tags, i.e. not necessarily all navigation tags of said sequence of navigation tags have to be consecutively passed. Skipping of navigation tags (roaming of the user) may for instance be noticed when passing of the next navigation tag is acknowledged.

A first preferred embodiment of a method of the present invention is characterised in that said positions are stored in a mobile navigation unit, that said mobile navigation unit further stores topographic information on the navigation area and that said sequence of navigation tags is determined by said mobile navigation unit based on said stored positions and said topographic information.

A second preferred embodiment of a method of the present invention is characterised in that said positions are stored in a host unit, that said host unit further stores topographic information on the navigation area, that said stored positions and topographic information are transferred to and stored in a mobile navigation unit, and that said sequence of navigation tags is determined by said mobile navigation unit based on said stored positions and said topographic information.

According to the second preferred embodiment of a method of the invention, said transfer of the stored positions and topographic information may be performed by means of a wired link between host unit and mobile navigation unit or by means of a wireless link.

A third preferred embodiment of a method of the present invention is characterised in that said positions are stored in a host unit, that said host unit further stores topographic information on the navigation area, that said sequence of navigation tags is determined by said host unit based on said stored positions and said topographic information, and that said sequence of navigation tags is transferred to a mobile-navigation unit from the host unit.

According to the third preferred embodiment of a method of the invention, said sequence of navigation tags may be transferred to said mobile navigation unit from said host unit at once, or in parts, whereby transfer of each part of said sequence of navigation tags is initiated by said acknowledgement of the passing of a navigation tag. In the first case, said sequence of navigation tags is also stored in the mobile navigation unit upon receipt, whereas in the second case, storage of each part of the sequence of navigation tags may be optional.

According to the third preferred embodiment of a method of the invention, said transfer of the sequence of navigation tags may be performed by means of a wired link between host unit and mobile navigation unit or by means of a wireless link.

According to the methods of the present invention, it is advantageous that said mobile navigation unit is capable of indicating information on the navigation tag that should be passed next.

Information on the navigation tag that should be passed next advantageously comprises the direction and/or distance to the next navigation tag, and/or an identifier of the next navigation tag.

Said identifier may be a colour and/or a number and/or a symbol.

Said information on the navigation tag that should be passed next is preferably indicated optically and/or acoustically and/or haptically.

According to the methods of the present invention, said acknowledgement of the passing of a navigation tag may be performed automatically or manually and may update said indication of the information on the navigation tag that should be passed next.

An automatic acknowledgement may be based on a wireless link between mobile navigation unit and navigation tag, such as a radio or optic link.

A manual acknowledgement may be based on a wired connection between mobile navigation unit and navigation tag, or by interaction between the user of the mobile navigation unit and the mobile navigation unit.

According to the methods of the present invention, it is further advantageous that the navigation tag itself is capable of storing information and that said information is transferred to said mobile navigation unit when the navigation tag is passed.

Such information may comprise the position of the navigation tag and/or information on the location within the navigation area where the navigation tag is mounted.

According to the methods of the present invention, the position of the navigation tags are preferably determined by means of a terrestrial or satellite-based positioning system such as the Global Positioning System (GPS) and/or by maps and/or plans of the navigation area.

The mobile navigation unit may be integrated into or compatible to a mobile device such as a mobile phone, a personal digital assistant or a GPS receiver.

According to the second preferred embodiment of a method of the invention, it is advantageous that the mobile navigation unit is integrated into or compatible to a mobile phone associated with a mobile radio system, that the core network of the mobile radio system can gain access to said host system, and that said stored positions and topographic information is transferred to the mobile navigation unit via the air interface of the mobile radio system.

According to the third preferred embodiment of a method of the invention, it is advantageous that the mobile navigation unit is integrated into or compatible to a mobile phone associated with a mobile radio system, that the core network of the mobile radio system can gain access to said host system, and that said sequence of navigation tags is transferred to the mobile navigation unit via the air interface of the mobile radio system.

The object of the invention is further solved by a system for navigating in a navigation area, wherein a plurality of navigation tags have been mounted at predetermined positions within said navigation area, characterised in that the system comprises means for determining a sequence of navigation tags, which are associated with a desired route within the navigation area, based on said positions of the navigation tags and on topographic information on the navigation area; and means for acknowledging the passing of a navigation tag, when said route is navigated by passing navigation tags of said sequence of navigation tags.

A first preferred embodiment of a system of the present invention is characterised in that said positions are stored in a storage unit that is comprised in a mobile navigation unit, that said mobile unit further comprises a storage unit with topographic information on the navigation area and that said mobile navigation unit further comprises means for determining the sequence of navigation tags based on the contents of both storage units.

A second preferred embodiment of a system of the present invention is characterised in that said positions are stored in a host unit, that said host unit further comprises a storage unit with topographic information on the navigation area, that said host unit and a mobile navigation unit comprise means for transferring said stored positions and topographic information from the host unit to the mobile navigation unit, that said mobile navigation unit further comprises means for storing said positions and topographic information, and and that said mobile navigation unit further comprises means for determining the sequence of navigation tags based on said stored positions and said stored topographic information.

According to the second preferred embodiment of a system of the present invention, said means for transferring said stored positions and topographic information are advantageously capable of establishing a wired link between host unit and mobile navigation unit or a wireless link.

A third preferred embodiment of a system of the present invention is characterised in that said positions are stored in a storage unit that is comprised in a host unit, that said host unit further comprises a storage unit with topographic information on the navigation area, that said host unit further comprises means for determining the sequence of navigation tags based on the contents of both storage units, and that said host unit and said mobile navigation unit comprise means for transferring said sequence of navigation tags from the host unit to the mobile navigation unit.

According to the third preferred embodiment of a system of the present invention, said means for transferring said sequence of navigation tags are advantageously capable of establishing a wired link between host unit and mobile navigation unit or a wireless link.

Said mobile navigation unit preferably comprises means for indicating information on the navigation tag that should be passed next.

Said means for indicating information on the navigation tag that should be passed next advantageously comprises optic and/or acoustic and/or haptic means.

It is further preferred that means are provided for automatic or manual acknowledgement of the passing of a navigation tag and that means are provided to update said indication of the information on the navigation tag that should be passed next.

Said automatic acknowledgement is preferably based on a wireless link between mobile navigation unit and navigation tag, such as a radio or optic link.

Said manual acknowledgement is preferably based on a wired connection between mobile navigation unit and navigation tag, or on means enabling an interaction between the user of the mobile navigation unit and the mobile navigation unit.

According to the systems of the present invention, it is further preferred that the navigation tag itself comprises means for storing information and that both navigation tag and mobile navigation unit comprise means for transferring said information from the navigation tag to the mobile navigation unit when the navigation tag is passed.

The mobile navigation unit may be integrated into a mobile device such as a mobile phone, a personal digital assistant or a GPS receiver.

According to the second preferred embodiment of a system of the present invention, it is preferred that the mobile navigation unit is integrated into or compatible to a mobile phone associated with a mobile radio system, that the core network of the mobile radio system can gain access to said host system, and that said stored positions and topographic information are transferred to the mobile navigation unit via the air interface of the mobile radio system.

According to the third preferred embodiment of a system of the present invention, it is preferred that the mobile navigation unit is integrated into or compatible to a mobile phone associated with a mobile radio system, that the core network of the mobile radio system can gain access to said host system, and that said sequence of navigation tags is transferred to the mobile navigation unit via the air interface of the mobile radio system.

Furthermore, the object of the invention is solved by a computer program product directly loadable into the internal memory of a digital computer, comprising software code portions for performing the steps of any of the aforementioned methods according to the present invention when said product is run on a computer.

BRIEF DESCRIPTION OF THE DRAWINGS

These and other aspects of the invention will be apparent from and elucidated with reference to the embodiments described hereinafter. In the figures show.

DETAILED DESCRIPTION

Figure 1:
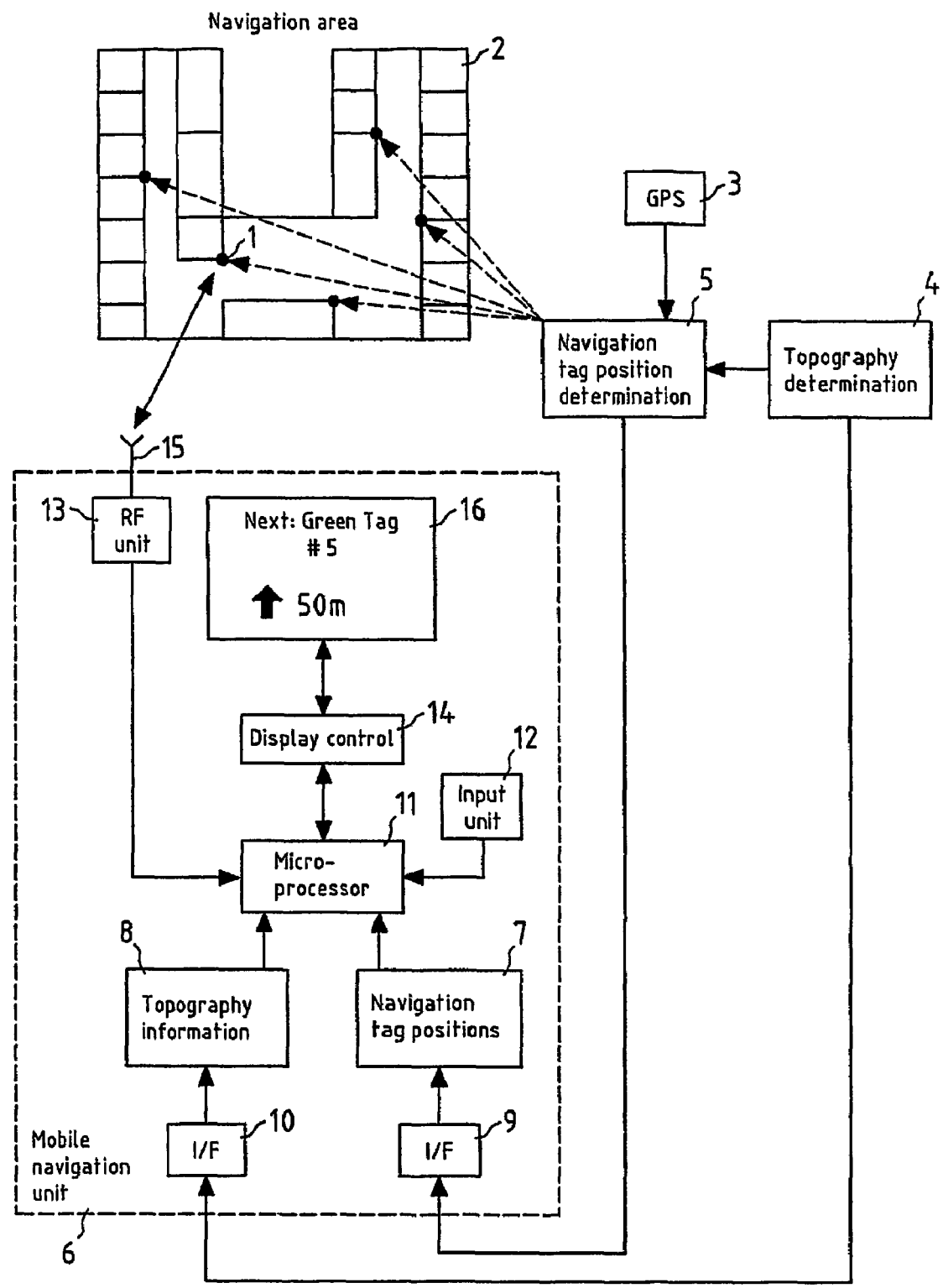
FIG. 1: a schematic view of a first embodiment of the present invention.

FIG. 1 depicts a schematic view of a first embodiment of the present invention. During installation of the navigation system, a plurality of navigation tags 1 is mounted at predetermined positions within a navigation area 2, in this case a building floor. The exact position of each of said navigation tags 1 is determined by a navigation tag position determination unit 5, based on the geographic coordinates as output by a GPS receiver 3 or based on topography information as output from a topography determination unit 4. Such a topography determination unit may represent a means that digitizes a map or a floor plan, if it is not already available as digital plan, or converts a digital topography format. The step of determining the exact positions of the navigation tags 1 also comprises the step of assigning each navigation tag a unique identifier within the navigation system, and, to furnish each navigation tag with electromagnetically, magnetically or optically readable further information such as its accurate position or its number.

According to the first embodiment of the invention, the exact positions of the navigation tags 1 as determined by the navigation tag position determination unit 5 and the digitised topography information as output by the topography determination unit are then transferred to the mobile navigation unit 6. The mobile navigation unit thus comprises storage units for the navigation tag positions 7 and the topography information 8. Said storage units 7 and 8 can be written to via interface units 9 and 10, respectively. The combination of interface unit 9 and storage unit 7 then represents an EEPROM, a flash memory or any other kind of writable or even re-writable storage medium with access means. However, frequent re-programming of the storage units 7 and 8 is not intended, and as a low cost variant, only programming the storage units 7 and 8 once is envisaged in this first embodiment of the invention, causing the mobile navigation unit 6 to be bound to use within the specific navigation area 2.

The mobile navigation unit 6 further comprises a microprocessor 11 that is capable of receiving route inputs from an input unit 12, performing routing tasks based on said route inputs, on the contents of the navigation tag position storage unit 7 and the topography storage unit 8, receiving and processing acknowledgements from an RF unit 13, and operating a display controller 14. When the user of the mobile navigation unit 6 enters a start position, either by entering a navigation tag number, geographical coordinates, a name of a room or a room number by means of a keypad, or by touching a desired point on the display 16 of the mobile navigation unit 6, or by any further external input such as barcode scanner or similar, this start position is stored in the microprocessor 11. A desired end position and intermediate positions on the route can be entered via the input unit 12 as well. When entering of the route points is finished, the microprocessor 11 determines a suited route within the navigation area 2 that connects all entered points, and especially considers which of the navigation tags should be passed when following the determined route from the start position to the end position. As a result, the microprocessor 11 then generates a sequence of navigation tags 1 that should be passed when navigating the route from the start position to the end position via the intermediate positions. Each entry in said sequence may define a unique identifier of a tag, such as a navigation tag number, or the unique geographic position of the tag. Further navigation information, such as how to navigate from the present navigation tag to the next, may be included in the entries within the sequence of navigation tags as well. The generation of the sequence of navigation tags 1 by the microprocessor 11 is based on the information contained in the navigation tag position storage unit 7 and the topography storage unit 8, to which the microprocessor 11 has access, and on the routing algorithm stored in the microprocessor itself or in its main memory.

After generation of said sequence of navigation tags 1 that should be passed when navigating the route, the microprocessor waits for the acknowledgement of the first navigation tag 1 of said sequence of navigation tags. Such an acknowledgement is generated by the RF unit 13, which is connected to an antenna 15. If the navigation tags 1 are embodied as transponders, the RF unit possesses the capability of activating the transponders when a certain distance between RF unit 13 and navigation tag 1 is fallen below, so that information programmed into these transponders can be read out by the RF unit 13. E.g, a unique identifier such as a number, or the geographical position of the navigation tag 1 that was programmed into the tag during the installation of the navigation system, can be read out. It is further possible to read out more information from the navigation tag 1, such as information on the location where the tag has been placed, which may be of interest in museums, exhibitions or in public places. Furthermore, the exchange of information between the RF unit 13 and the navigation tag can be achieved by an optical link, such as e.g. a barcode scanner, or magnetically. Even a wired connection is possible, when the user of the mobile navigation unit 6 connects the unit to each navigation tag 1 by means of a cable. The only demand is that the exchange of information is robust and limited to short range, to ensure accurate navigation and to limit the power consumption of the mobile navigation unit. Information read out from the navigation tags is signalled to the microprocessor 11 by the RF unit 13 as an acknowledgement of said navigation tag. The microprocessor thus is informed that a navigation tag has been passed and then waits for the acknowledgement of the next navigation tag of the sequence of navigation tags. Each time an acknowledgement is received, the microprocessor 11, via the display control unit 14, changes the information depicted on the display 16, so that the user of the mobile navigation unit is provided with new information on how to proceed with the route. Such information on the display 16 may comprise the number of the next navigation tag 1, its colour, if colour-coded navigation tags 1 are deployed, or, if a gyroscopic compass is included within the mobile navigation unit 6 under the control of the microprocessor 11, a direction towards the next navigation tag 1. Said information is generated in the context of the generation of said sequence of navigation tags 1 by the microprocessor 11. Alternatively, in a low-cost embodiment of the mobile navigation unit, the acknowledgements are not provided by the RF unit 13, but by the user of the mobile navigation unit 6 itself. The RF unit then can be saved, and the navigation tags 1 do not have to be embodied as transponders. It is then sufficient to use signs as navigation tags, where when reaching a sign, the user acknowledges passing of the sign via the input unit 12, and the number and/or directions to the next sign are displayed.

The microprocessor 11 also possesses the capability of error handling and error recovery, such as e.g. recognising that navigation tags have not been passed on the route or that the user is roaming, i.e. significantly deviating from the originally desired route.

Figure 2:
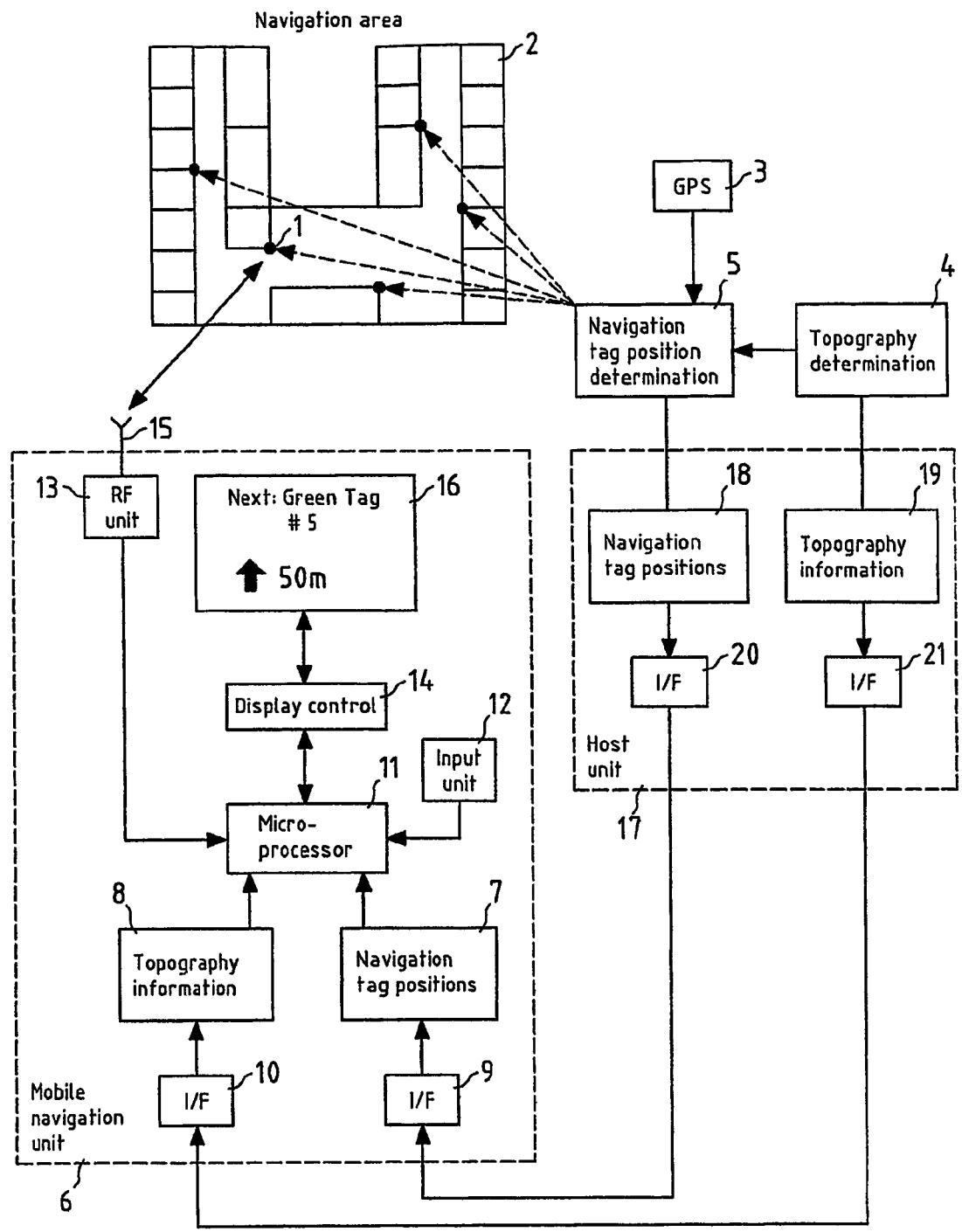
FIG. 2: a schematic view of a second embodiment of the present invention.

FIG. 2 depicts a schematic view of a second preferred embodiment according to the present invention. In contrast to the first embodiment of FIG. 1, a host unit 17 is provided, which comprises a navigation tag position storage unit 18 and a topography storage unit 19. During the installation of the navigation system, the exact positions of the navigation tags 1 as determined by the navigation tag position determination unit 5 are loaded into the navigation tag position storage unit 18, and the output of the topography determination unit 4 is loaded into the topography storage unit 19. The host unit further comprises interfaces 20 and 21, which, in combination with the interfaces 9 and 10 as provided in the mobile navigation unit 6, allow to transfer the contents of the navigation tag position storage unit 18 and of the topography storage unit 19 into the navigation tag position storage unit 7 and the topography storage unit 8 of the mobile navigation unit 6. In contrast to the first embodiment, in the present second embodiment, frequent re-writing of the storage units 7 and 8 of the mobile navigation unit is intended, and the storage units are specified accordingly. With the entire information required for navigating a route within the navigation scenario depending on the contents of the navigation tag position storage units 18/7 and of the topography storage units 19/8, the mobile navigation unit 6 becomes independent of the navigation area 2 and can be used equally well in different navigation areas. When a mobile navigation unit 6 is to be used in a new navigation area 2, simply the navigation tag positions and the topography information are transferred from the storage units 18 and 19 of the host unit to the storage units 7 and 8 of the mobile navigation unit 6, respectively. The data transfer, which is controlled by the interface units 20 and 21 and 9 and 10, can be based on a wired or wireless connection, such as an infra-red link or a radio link, e.g. a Bluetooth connection. The host unit then will be provided at a central location in the navigation area 2, for instance a reception desk in a hospital. After data transfer, the navigation can be managed by the mobile navigation unit itself, as already described for the first embodiment of the invention.

If the mobile navigation unit is included in a mobile phone, the storage units 18 and 19 of the host unit 17 can be made accessible to the core network of the mobile radio system that covers the mobile phone via an intra- or the internet. The data transfer between the storage units 18 and 19 of the host unit to the storage units 7 and 8 of the mobile navigation unit then is performed based on a standard data call between the mobile phone and the core network, e.g. a GPRS connection. It is thus possible to navigate in different navigation scenarios 2 with the same mobile phone.

Figure 3:
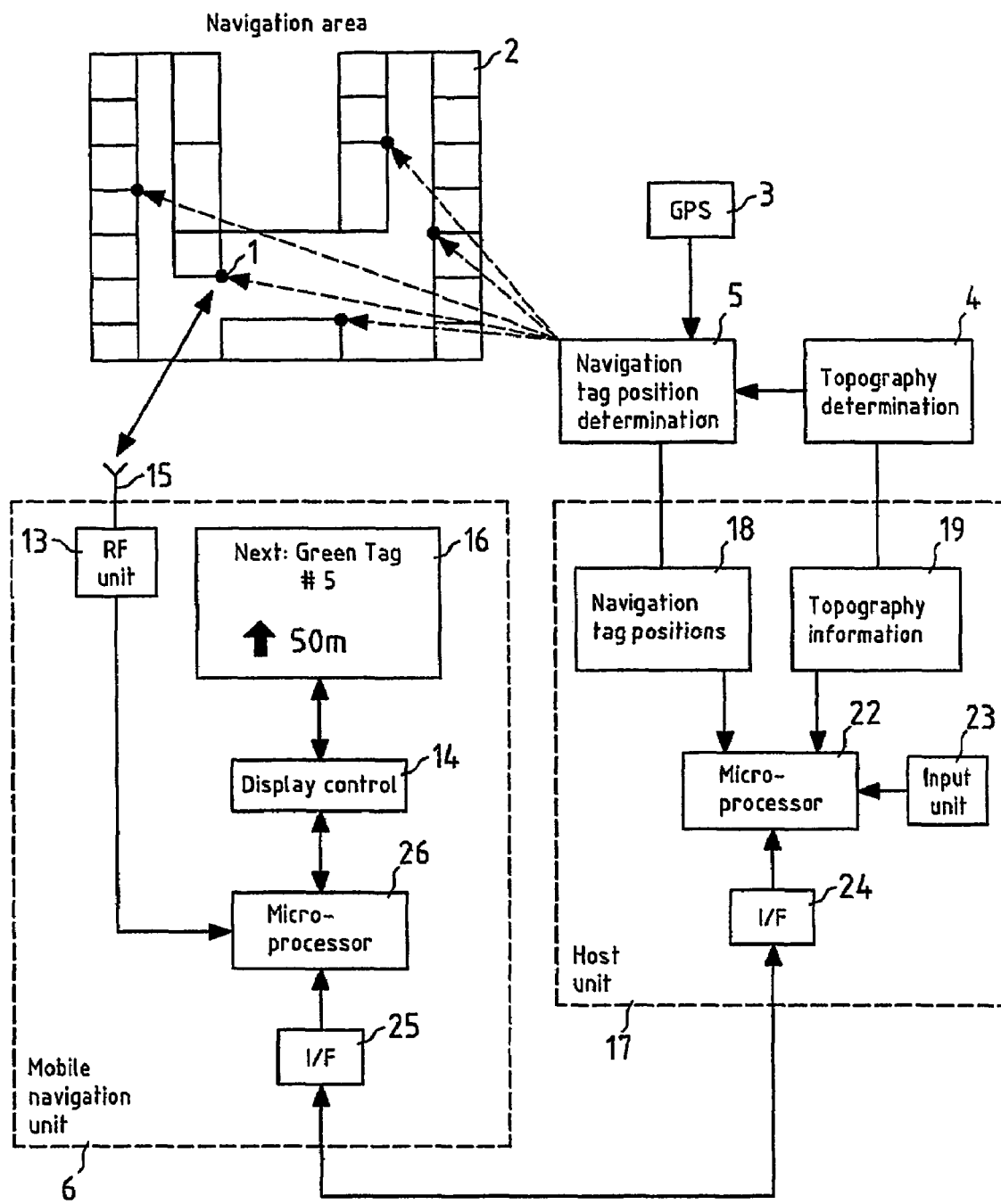
FIG. 3: a schematic view of a third embodiment of the present invention.

FIG. 3 finally depicts a schematic view of a third preferred embodiment according to the present invention. In contrast to the second embodiment of the invention as depicted in FIG. 2, the third embodiment contains a host unit 17 that comprises storage units for the navigation tag positions 18 and the topography information 19, and additionally a microprocessor 22 that is capable of receiving route inputs from an input unit 23 and of performing routing tasks based on said input routes, on the navigation tag position storage unit 18 and on the topography storage unit 19. The microprocessor 22 thus determines a sequence of navigation tags that have to be passed when navigating a desired route within the navigation area 2. The microprocessor 22 is connected to an interface unit 24, which corresponds to an interface unit 25 in the mobile navigation unit 6. Between both interface units 24 and 25, a wired or wireless connection can be established to transfer the sequence of navigation tags as determined by the microprocessor 22 from the host unit 17 to the mobile navigation unit 6. Within the mobile navigation unit 6, the interface unit 25 forwards a received sequence of navigation tags to a microprocessor 26 of the mobile navigation unit 6, where it is stored in the internal memory of the microprocessor or in an additional storage device provided in the mobile navigation unit 6. In the present third embodiment of the invention, the microprocessor 26, as compared to the microprocessor 11 of the first and second embodiment, has limited complexity and is only capable of operating the display controller 14 and receiving acknowledgements from the RF unit 13. However, error handling and recovery procedures are executed by the microprocessor 26 as well in order to manage skipped navigation tags and roaming of the user.

Note that, instead of transferring the complete sequence of navigation tags at once, it is also possible that after acknowledgement of a passed navigation tag, one or several new entries in the sequence of navigation tags are transferred from the host unit 17 to the mobile navigation unit 6, possibly together with further information on the location where the currently passed navigation tag is mounted.

As in the second embodiment of the invention, if the mobile navigation unit 6 is part of a mobile phone, and the navigation tag positions and the topography information are accessible to the core network of the mobile radio network that covers the mobile phone via an intra- or the internet, the sequence of navigation tags as determined by the microprocessor 22 of the host unit 17 can be transferred to the mobile navigation unit 6 via a data call, e.g. via a GPRS connection. Due to the fact that the entire calculation of the route and the determination of the sequence of navigation tags is performed by the host unit, only minor complexity is required to implement the functionality of the mobile navigation unit 6 within the mobile phone. This especially holds for the case when the RF unit 13 is spared and passed navigation tags are acknowledged by the user himself, as described before. As in the second embodiment of the present invention, the mobile phone is still independent of the specific navigation area 2.

The invention has been described above by means of preferred embodiments. It should be noted that there are alternative ways and variations which are obvious to a skilled person in the art and can be implemented without deviating from the scope and spirit of the appended claims, e.g. the storage units in the mobile navigation unit may be included into the memory of the microprocessor, or the interface units between the mobile navigation unit and the host unit may be combined into one single interface unit.

What is claimed is:

1. A method comprising:
   receiving, at a mobile navigation unit, a sequence of navigation tags transferred from a host unit in parts, wherein said sequence of navigation tags is associated with a desired route within a navigation area, in which a plurality of navigation tags are mounted at predetermined positions, and determining said sequence based on said positions of said navigation tags and on topographic information on the navigation area, and
   navigating said route by passing navigation tags of said sequence of navigation tags, wherein passing of a navigation tag is acknowledged, and wherein transfer of each part of said sequence of navigation tags is initiated by said acknowledgement of said passing of a navigation tag.

2. The method according to claim 1, wherein said transfer of said sequence of navigation tags is performed via a wired link between host unit and mobile navigation unit or via a wireless link.

3. The method according to claim 1, wherein said mobile navigation unit is capable of indicating information on a navigation tag that should be passed next.

4. The method according to claim 3, wherein said information on said navigation tag that should be passed next comprises a direction and/or distance to said next navigation tag, and/or an identifier of said next navigation tag.

5. The method according to claim 4, wherein said identifier is a colour and/or a number and/or a symbol.

6. The method according to claim 3, wherein said information on said navigation tag that should be passed next is indicated optically and/or acoustically and/or haptically.

7. The method according to claim 3, wherein said acknowledgement of said passing of a navigation tag is performed automatically or manually and updates said indication of said information on said navigation tag that should be passed next.

8. The method according to claim 7, wherein said automatic acknowledgement is based on a wireless link between mobile navigation unit and navigation tag.

9. The method according to claim 7, wherein said manual acknowledgement is based on a wired connection between mobile navigation unit and navigation tag, or by interaction between a user of said mobile navigation unit and said mobile navigation unit.

10. The method according to claim 1, wherein said navigation tag itself is capable of storing information and wherein said information is transferred to said mobile navigation unit when said navigation tag is passed.

11. The method according to claim 10, wherein said information comprises a position of said navigation tag and/or information on a location within said navigation area where said navigation tag is mounted.

12. The method according to claim 1, wherein positions of said navigation tags are determined by a terrestrial or satellite-based positioning system and/or by maps and/or plans of the navigation area.

13. The method according to claim 1, wherein said mobile navigation unit is integrated into or compatible to one of a mobile phone, a personal digital assistant and a GPS receiver.

14. The method according to claim 1, wherein said mobile navigation unit is integrated into or compatible to a mobile phone associated with a mobile radio system, wherein a core network of said mobile radio system can gain access to said host unit, and wherein said sequence of navigation tags is transferred to said mobile navigation unit via an air interface of said mobile radio system.

15. A computer-readable medium stored with software code portions for performing the method of claim 1 when said software code portions are run on a computer.

16. A mobile navigation unit comprising:
    an interface configured to receive a sequence of navigation tags from a host unit in parts, wherein said sequence of navigation tags is associated with a desired route within a navigation area, in which a plurality of navigation tags are mounted at predetermined positions, and is determined based on said positions of said navigation tags and on topographic information on said navigation area; and
    an acknowledgement component configured to acknowledge passing of a navigation tag, when said route is navigated by passing navigation tags of said sequence of navigation tags, wherein transfer of each part of said sequence of navigation tags is initiated by said acknowledgement of said passing of a navigation tag.

17. The mobile navigation unit according to claim 16, wherein said mobile navigation unit is configured to receive said sequence of navigation tags from said host unit via a wired link or via a wireless link.

18. The mobile navigation unit according to claim 16, wherein said mobile navigation unit is configured to indicate information on the navigation tag that should be passed next.

19. The mobile navigation unit according to claim 18, wherein said mobile navigation unit is configured to indicate said information on said navigation tag that should be passed next optically and/or acoustically and/or haptically.

20. The mobile navigation unit according to claim 18, wherein said mobile navigation unit is configured to automatically or manually acknowledge passing of a navigation tag, and to update said indication of said information on said navigation tag that should be passed next.

21. The mobile navigation unit according to claim 20, wherein said automatic acknowledgement is based on a wireless link between mobile navigation unit and navigation tag.

22. The mobile navigation unit according to claim 20, wherein said manual acknowledgement is based on a wired connection between mobile navigation unit and navigation tag, or on an interaction between a user of said mobile navigation unit and said mobile navigation unit.

23. The mobile navigation unit according to claim 16, wherein said navigation tag itself is configured to store information, and wherein both said navigation tag and said mobile navigation unit are configured to transfer said information from said navigation tag to said mobile navigation unit when said navigation tag is passed.

24. The mobile navigation unit according to claim 16, wherein said mobile navigation unit is integrated into one of a mobile phone, a personal digital assistant and a GPS receiver.

25. The mobile navigation unit according to claim 16, wherein said mobile navigation unit is integrated into or compatible to a mobile phone associated with a mobile radio system, wherein a core network of said mobile radio system can gain access to said host unit, and wherein said sequence of navigation tags is transferred to said mobile navigation unit via an air interface of said mobile radio system.

26. A mobile navigation unit, comprising:
  means for receiving a sequence of navigation tags from a host unit in parts, wherein said sequence of navigation tags is associated with a desired route within a navigation area, in which a plurality of navigation tags is mounted at predetermined positions, and is determined based on said positions of said navigation tags and on topographic information on said navigation area; and
  means for acknowledging passing of a navigation tag, when said route is navigated by passing navigation tags of said sequence of navigation tags, wherein transfer of each pat of said sequence of navigation tags is initiated by said acknowledgement of said passing of a navigation tag.

27. A method, comprising:
  determining, at a host unit, a sequence of navigation tags that is associated with a desired route within a navigation area, in which a plurality of navigation tags are mounted at predetermined positions, based on said positions of said navigation tags and on topographic information on said navigation area; and
  transferring said sequence of navigation tags in parts to a mobile navigation unit to allow said mobile navigation unit to navigate said route by passing navigation tags of said sequence of navigation tags, wherein passing of a navigation tag is acknowledged, and wherein transfer of each part of said sequence of navigation tags is initiated by said acknowledgement of said passing of a navigation tag.

28. The method according to claim 27, wherein said transfer of said sequence of navigation tags is performed via a wired link between host unit and mobile navigation unit or via a wireless link.

29. The method according to claim 27, wherein said mobile navigation unit is integrated into or compatible to a mobile phone associated with a mobile radio system, wherein a core network of said mobile radio system can gain access to said host unit, and wherein said sequence of navigation tags is transferred to said mobile navigation unit via an air interface of said mobile radio system.

30. A computer-readable medium stored with software code portions for performing the method of claim 27 when said software code portions are run on a computer.

31. A host unit comprising:
  a processor configured to determine a sequence of navigation tags that is associated with a desired route within a navigation area, in which a plurality of navigation tags are mounted at predetermined positions, based on said positions of said navigation tags and on topographic information on said navigation area; and
  an interface configured to transfer said sequence of navigation tags in parts to a mobile navigation unit to allow said mobile navigation unit to navigate said route by passing navigation tags of said sequence of navigation tags, wherein passing of a navigation tag is acknowledged, and wherein transfer of each part of said sequence of navigation tags is initiated by said acknowledgement of said passing of a navigation tag.

32. The host unit according to claim 31, wherein said transfer of said sequence of navigation tags is performed via a wired link between host unit and mobile navigation unit or via a wireless link.

33. The host unit according to claim 32, wherein said mobile navigation unit is integrated into or compatible to a mobile phone associated with a mobile radio system, wherein a core network of said mobile radio system can gain access to said host unit, and wherein said sequence of navigation tags is transferred to said mobile navigation unit via an air interface of said mobile radio system.

34. A host unit comprising:
  means for determining a sequence of navigation tags that is associated with a desired route within a navigation area, in which a plurality of navigation tags is mounted at predetermined positions, based on said positions of said navigation tags and on topographic information on said navigation area; and
  means for transferring said sequence of navigation tags in parts to a mobile navigation unit to allow said mobile navigation unit to navigate said route by passing navigation tags of said sequence of navigation tags, wherein passing of a navigation tag is acknowledged, and wherein transfer of each part of said sequence of navigation tags is initiated by said acknowledgement of said passing of a navigation tag.

* * * * *